United States Patent Office 2,793,239
Patented May 21, 1957

2,793,239
ALKYLATION OF AROMATIC COMPOUNDS

William G. Toland, Jr., San Rafael, Calif., assignor to California Research Corporation, San Francisco, Calif., a corporation of Delaware No Drawing. Application March 14, 1955,
Serial No. 494,229

9 Claims. (Cl. 260—671)

This invention relates to a process for the alkylation of aromatic compounds, and more particularly to such a process employing a dilute aqueous solution of an acid-reacting alkylation catalyst or condensing agent.

The preparation of aromatic alkyl compounds in which one or more hydrogen atoms on the aromatic nucleus are replaced with one or more alkyl radicals involving the use of highly concentrated strong acids as condensing agents has been described in the prior art. Compounds thus prepared can be useful in themselves or as intermediates in the preparation of more valuable materials. Illustrative of prior art practice is U. S. Patent No. 2,275,-312, which describes a process for the preparation of isocyclic alkyl compounds by replacing one or more of the hydrogen atoms of the isocyclic compound with one or more alkyl radicals in the presence of concentrated hydrofluoric acid as the condensing agent. The present invention contemplates the preparation of similar compounds involving a process, hereinafter more fully described, which employs a highly dilute aqueous solution of an acid-acting catalyst, e. g., sulfuric acid or copper sulfate, phosphoric acid or hydrochloric acid. Included among the advantages of the invention are the requirement of much less acid than heretofore employed in alkylation processes, ease of product recovery, a minimum of undesirable by-product tars and polymers, and a clean recyclable aqueous catalyst phase.

The present invention is predicated on the discovery that nuclear alkylation of aromatic compounds can readily be accomplished at elevated temperatures and pressures in the presence of a strong but highly dilute acid-acting catalyst solution of an acid concentration ranging from about 0.05%, preferably 0.1%, to about 10%, preferably 1%, by weight, with an effective amount of catalyst that can vary from a fraction of the total reactants to an excess over the reactants. Alkylation is readily effected at temperatures ranging from about 450° F. up to the critical temperature of the catalyst solution, i. e., about 700° F. Suitable pressures range from about 1000 p. s. i. g. up to 3000 p. s. i. g. and higher. The time necessary for completion of the reaction varies with the reactants and alkylation conditions. Thus, the time required for completion of the reaction has been found to vary from a period of time less than one hour to several hours.

Suitable catalysts which can be employed in carrying out the invention are those acid reacting materials which in the presence of water yield acid ions. In general, a suitable catalyst is one which is capable of yielding ions of an inorganic acid which has an ionization constant greater than $1 \times 10^{-4}$. These materials include such inorganic acids as hydrochloric, phosphoric, sulfuric and hydrofluoric; such acid-reacting salts as copper sulfate, zinc chloride, copper chloride, zinc sulfate, and the like; and salts of organic nitrogen bases, such as quinoline phosphate and pyridine sulfates.

A number of aromatic compounds are alkylatable under the conditions hereinabove described. These include unsubstituted aromatic hydrocarbons, e. g., benzene or naphthalene; alkyl- and hydroxy-substituted aromatic compounds.

The preferred alkylating agent is an olefin, an alcohol or an ether. In general the alkylating agent is one which produces a tertiary or quaternary carbon upon alkylation and contains at least three carbon atoms in the alkyl portion of the molecule. Alkylating agents with as many as eight carbon atoms in the alkyl portion of the molecule can be used. In other words, the alkylating agents can be defined as having an alkyl group of at least three carbon atoms, and include unsaturated compounds and those which under the reaction conditions give rise to unsaturated hydrocarbons by the elimination of water, acids, amines, mercaptans, alcohols, hydrogen halide and hydrogen sulfide. The alkyl radicals may be of straight or branched chain structure, as well as alicyclic, and may have substituent groups or radicals, e. g., hydroxyl or carboxyl groups, or halogen. It has moreover been found that of the olefins, the tertiary olefins react more readily than the secondary; hence, the milder catalysts can be employed when tertiary olefins are employed as the alkylating agents.

In order further to illustrate the practice of the invention, the following examples are given, it being understood that these examples are not to be construed as limiting the invention thereto, since the invention obviously admits of many modifications and variations.

Example 1

A 4.5 liter, stainless steel autoclave was charged with 920 g. of toluene and 470 cc. of liquid isobutene. The autoclave was sealed and heated with shaking to 550° F. for one hour. While still at temperature, 65 cc. of the liquid phase was bled from the vessel and found to contain only isobutene and toluene. The temperature was then raised to 624° F. over the next two hours. The pressure rose to 1100 p. s. i. g. The bomb was cooled and the liquid products removed and fractionally distilled. Only isobutene and toluene were obtained.

The example shows that isobutene will not alkylate toluene at this temperature in the absence of a catalyst.

Example 2

A 4.5 liter, stainless steel, shaking autoclave was charged with 900 cc. of water, 25 g. of copper sulfate pentahydrate, 460 g. of toluene, and 375 cc. of liquid isobutene. The autoclave was sealed and heated with shaking to 550° F. for two hours. The initial pressure at temperature was 1775 p. s. i. g. and after two hours had dropped to 1625 p. s. i. g. The pressure curve indicated that appreciable reaction occurred at about 530° F. and that the main reaction was probably over in less than one hour. The autoclave was cooled and 0.05 cubic feet of gas bled from the vessel. The liquid products were removed and separated, yielding 656.4 g. of organic layer. This was fractionally distilled through a one-foot helices packed column. A toluene forerun of 8 g. was obtained, boiling between 85° C. and 110° C., followed by a fraction of 531.4 g. which contained approximately 24% diisobutylene and 76% toluene, boiling point 110° C. to 111.5° C. There followed 12.7 g. of an intermediate fraction, boiling between 112° C. and 185° C.

The next fraction, 20.6 g., boiling between 185° C. and 190° C., had the following properties:

| $n_{20}^D$ | $D_{20}^{20}$ | Bromine No. |
|---|---|---|
| 1.4692 | 0.8252 | 45 |

This fraction was found by infrared analysis to consist largely of ortho-, meta-, and para-t-butyltoluene, the meta- and para- being in the ratio 3:1 and the amount of ortho being very small. The next fraction of 26.2 g., boiling between 190° C. and 193° C. had the following properties:

| $n_{20}^D$ | $D_{20}^{20}$ | Bromine No. |
|---|---|---|
| 1.4849 | 0.8516 | 19 |

This fraction was found by infrared analysis to contain ortho-, meta-, and para-t-butyltoluene in the ratio 5:10:85.

Example 3

The equipment of the preceding example was charged with 900 cc. of water, 25 g. of copper sulfate pentahydrate, 460 g. of toluene, and 168 g. of propylene. The autoclave was sealed, shaken, and heated to 550° F. for two hours. The initial pressure at temperature was 1925 p. s. i. g. During the reaction period, the pressure dropped 142 p. s. i. and remained constant after 100 minutes, indicating completion of reaction. The autoclave was cooled and 1.346 cubic feet of gas bled off. Work-up of the products as in the preceding example resulted in the recovery of 370 g. of toluene and the isolation of 95.3 g. of mixed cymenes. Analysis of the cymene fraction by infrared spectroscopy showed the presence of approximately 40% para-, 30% meta-, and 30% orthocymene. Distillation of the water layer yielded 27.8 g. of isopropyl alcohol. The yield of cymenes was approximately 72% of theory based on the toluene.

Example 4

A 2.5 liter, stainless steel, shaking autoclave was charged with 900 cc. of water, 25 g. of copper sulfate pentahydrate, 460 g. of toluene, and 240 g. of isopropyl alcohol. The autoclave was sealed, shaken, and heated to 550° F., generating an initial pressure of 3325 p. s. i. g. After 40 minutes, the pressure had dropped to 2825 p. s. i. g. and after 190 minutes had leveled out to 2300 p. s. i. g. The autoclave was cooled to room temperature, and excess propylene in the amount of 0.954 cubic foot was bled off. Work-up of the liquid products yielded 348 g. of toluene, 114 g. of cymenes, and approximately 10 cc. of higher boiling products. Infrared analysis of the cymene fraction indicated approximately 35% para-, 25% meta-, and 40% orthocymene.

Example 5

To a Pyrex glass liner designed to fit a 4.5 liter stainless steel autoclave was charged 450 cc. of water, 2.8 cc. 96% sulfuric acid, 305 cc. isopropyl alcohol, and 355 cc. of benzene. The autoclave was sealed, shaken, and heated to 600° F. for 2.5 hours. The maximum pressure was 2500 p. s. i. g. The autoclave was cooled, and 2.6 cubic feet of unreacted propylene was recovered. The liquid products were worked up as in the preceding examples and were found to contain 7.9 g. diisopropyl ether, 12.0 g. propylene dimer, and 48 g. of cumene.

Example 6

The glass liner of the preceding example was charged with 450 cc. of water, 2.8 cc. of 96% sulfuric acid, 305 cc. isopropyl alcohol, 376 g. of phenol. The vessel was sealed, shaken, and heated to 600° F. for one hour, generating a pressure of 1575 p. s. i. g. The vessel was cooled to room temperature and 0.15 cubic foot of propylene bled off. The remaining products, containing two phases, were first separated, the organic layer washed free of acid catalyst with water, and then distilled through a one-foot helices packed column.

There was obtained 113.6 g. of a fraction boiling between about 210° C. and 220° C., and having a density of $d_4^{20}$ 0.9924, $n_D^{20}$ 1.5269. Infrared analysis showed it to contain ortho- and para-isopropyl phenol in the ratio of about 2:1 and very little meta.

Another fraction, 60.2 g., boiling between 220° C. and 230° C., and having a density of $d_4^{20}$ 0.9813, $n_D^{20}$ 1.5232 contained largely para-isopropyl phenol, some 2,4-diisopropyl phenol, and a very small amount of 3,5-diisopropyl phenol.

2,4,6-triisopropyl phenol was obtained in a fraction boiling between 247° C. and 250° C., weighing 72.3 g. and having a density of $d_4^{20}$ 0.9507, $n_D^{20}$ 1.5142.

Example 7

The glass liner of the preceding examples was charged with 450 cc. of water, 25 g. of 85.8% phosphoric acid, 460 g. of toluene, and 375 cc. of liquid isobutene. The vessel was sealed, shaken, and heated to 600° F. for two hours, generating a pressure of 2525 p. s. i. The vessel was cooled to room temperature and 0.10 cubic foot of unreacted isobutene bled off. The two phases of liquid products were first separated, the organic layer washed free of acid catalyst, and then distilled through a one-foot helices packed column. The charge to the column consisted of 570.2 g. The following cuts were obtained: Cut 1, boiling point 78.5–105° C., 13.0 g. (17.0 cc.), largely moist toluene; cut 2, boiling point 110–112° C, 478.1 g. (570 cc.), essentially pure toluene; cut 3, boiling point 117–187° C., 10.7 g. (13.5 cc.) of intermediate fraction; cut 4, boiling point 188–194° C., 23.5 g. (28.7 cc.) of mixed t-butyltoluenes. A residue of 9.6 g. (11 cc.) remained in the pot.

Example 8

The preceding example was repeated substituting 0.25 mol of aqueous hydrochloric acid for the phosphoric acid. The results were qualitatively the same, with the exception that the t-butyltoluene fraction was slightly greater.

Example 9

The glass liner used in the earlier examples was charged with 450 cc. of water, 2.8 cc. of 96% sulfuric acid, 306 g. of diisopropyl ether, and 424 g. of metaxylene. The vessel was sealed, shaken, and heated to 625° F. for one hour, generating a pressure of about 2000 p. s. i. The vessel was then cooled to room temperature and 0.53 cubic foot of propylene bled off. The organic phase of the liquid products was separated, washed free of acid catalyst, and distilled through a one-foot helices packed column to yield the following fractions: unconverted metaxylene, an intermediate boiling fraction, an isopropyl metaxylene fraction, and a small amount of higher boiling products. The aqueous phase of the reaction products was distilled to yield isopropyl alcohol and some unreacted diisopropyl ether.

Example 10

A Monel autoclave of 4.5 liter capacity was charged with 900 cc. water, 35 g. of cupric fluoride dihydrate, 390 g. of benzene and 280 g. of pentene-1. The autoclave was heated, shaken at 580° F. for two hours, after which it was cooled and opened. The phases were separated. The organic phase was distilled to recover a mixed pentene fraction, unconverted benzene, a mixed amyl alcohol fraction, and a mixed amyl benzene fraction, boiling point 185–200° C. Only a small amount of residue remained.

Obviously many modifications and variations of the invention, as hereinbefore set forth, may be made without departing from the spirit and scope thereof and, therefore, only such limitations should be imposed as are indicated in the appended claims.

I claim:

1. In a process of nuclear alkylation involving the condensation of an alkylating agent having an alkyl group of at least three carbon atoms and an aromatic hydrocarbon, the improvement which comprises effecting said condensation at elevated temperatures and pressures in the presence of a dilute aqueous solution of a strong acid acting catalyst, the acid acting catalyst content of the solution being in the range from about 0.05% to about 10% by weight.

2. Improvement according to claim 1 wherein the catalyst solution is of an acid concentration ranging from about 0.1% to 1%, by weight.

3. In a process of nuclear alkylation involving the condensation of an alkylating agent having an alkyl group of at least three carbon atoms and an aromatic hydrocarbon, the improvement which comprises effecting said condensation under superatmospheric pressures and at a temperature within about the range of 450° F. to 700° F. and in the presence of a dilute aqueous solution of a strong acid catalyst, the acid catalyst content of the solution being in the range from about 0.05% to 10% by weight.

4. Improvement according to claim 3 wherein the alkylating agent is selected from the group consisting of olefins, alcohols and ethers.

5. Improvement according to claim 4, wherein the alkylating agent has 3 to 8 carbon atoms.

6. Improvement according to claim 5, wherein the acid-acting catalyst is sulfuric acid.

7. Improvement according to claim 5, wherein the acid-acting catalyst is phosphoric acid.

8. Improvement according to claim 5, wherein the acid-acting catalyst is hydrochloric acid.

9. Improvement according to claim 5, wherein the acid-acting catalyst is a salt selected from the group consisting of the copper salts of phosphoric and hydrochloric acids.

References Cited in the file of this patent
UNITED STATES PATENTS

| | | |
|---|---|---|
| 2,060,573 | Hester | Nov. 10, 1936 |
| 2,405,874 | Bullard et al. | Aug. 13, 1946 |
| 2,442,878 | Schmerling et al. | June 8, 1948 |
| 2,560,666 | Stevens et al. | July 17, 1951 |
| 2,618,614 | Bielawski et al. | Nov. 18, 1952 |
| 2,686,815 | Nickels | Aug. 17, 1954 |